United States Patent
Kerkoc

(10) Patent No.: US 11,377,026 B2
(45) Date of Patent: Jul. 5, 2022

(54) FURNISHING COMPONENT FOR RECREATIONAL VEHICLES

(71) Applicant: TECNOFORM S.P.A., Valsamoggia (IT)

(72) Inventor: Roberto Kerkoc, Valsamoggia (IT)

(73) Assignee: Tecnoform S.p.A., Valsamoggia (IT)

( * ) Notice: Subject to any disclaimer, the term of this patent is extended or adjusted under 35 U.S.C. 154(b) by 0 days.

(21) Appl. No.: 16/328,222

(22) PCT Filed: Aug. 25, 2017

(86) PCT No.: PCT/IB2017/055127
§ 371 (c)(1),
(2) Date: Feb. 25, 2019

(87) PCT Pub. No.: WO2018/037383
PCT Pub. Date: Mar. 1, 2018

(65) Prior Publication Data
US 2019/0210521 A1 Jul. 11, 2019

(30) Foreign Application Priority Data

Aug. 25, 2016 (IT) .......................... 102016000087371

(51) Int. Cl.
*B60Q 3/78* (2017.01)
*E06B 5/00* (2006.01)
(Continued)

(52) U.S. Cl.
CPC ................ *B60Q 3/78* (2017.02); *B60Q 3/20* (2017.02); *B60Q 3/40* (2017.02); *B60Q 3/51* (2017.02);
(Continued)

(58) Field of Classification Search
CPC ... B60Q 3/20; B60Q 3/40; B60Q 3/51; B60Q 3/54; B60Q 3/78; F21V 3/0625; E06B 5/006
See application file for complete search history.

(56) References Cited

U.S. PATENT DOCUMENTS 3,950,049 A * 4/1976 Drass ................... A47B 95/008
312/245
4,097,100 A * 6/1978 Sauder ................. A47B 96/201
312/204
(Continued)

FOREIGN PATENT DOCUMENTS

DE 202006014405 U1 * 1/2008 .......... F21V 33/0012
DE 202006014405 U1 1/2008
(Continued)

OTHER PUBLICATIONS

Machine Translation of DE 20 2006 014 405 U1, Mar. 15, 2020 (Year: 2020).*

*Primary Examiner* — Bryon T Gyllstrom
*Assistant Examiner* — Christopher E Dunay
(74) *Attorney, Agent, or Firm* — David B. Tingey; Bryant J. Keller; Kirton McConkie

(57) ABSTRACT

The furnishing component for recreational vehicles comprising: a fixed portion associated with a recreational vehicle and defining a space of use; and a movable portion associated with the fixed portion in a variable manner between an opening position in which the movable portion is at least partially moved away from the fixed portion to allow the access to the space of use, and a closing position in which the movable portion is moved close to the fixed portion to prevent the access to the space of use; at least one emitter element of a luminous flux associated with the fixed portion; and at least one diffusing element associated with the
(Continued)

movable portion and at least partially exposed to the luminous flux for its diffusion in the environment.

10 Claims, 2 Drawing Sheets

(51) Int. Cl.
  *B60Q 3/54*    (2017.01)
  *B60Q 3/20*    (2017.01)
  *B60Q 3/51*    (2017.01)
  *B60Q 3/40*    (2017.01)
  *F21V 3/06*    (2018.01)
  *B60P 3/36*    (2006.01)
  *F21Y 115/10*   (2016.01)
  *F21W 106/00*   (2018.01)
  *F21W 107/10*   (2018.01)
  *A47B 81/00*    (2006.01)
  *F21W 111/08*   (2006.01)

(52) U.S. Cl.
  CPC .............. *B60Q 3/54* (2017.02); *E06B 5/006* (2013.01); *F21V 3/0625* (2018.02); *A47B 81/00* (2013.01); *A47B 2220/005* (2013.01); *A47B 2220/0077* (2013.01); *B60P 3/36* (2013.01); *F21W 2106/00* (2018.01); *F21W 2107/10* (2018.01); *F21W 2111/08* (2013.01); *F21Y 2115/10* (2016.08)

(56) References Cited

U.S. PATENT DOCUMENTS

| | | | | | |
|---|---|---|---|---|---|
| 4,135,369 | A * | 1/1979 | Allgeyer | .............. | A47F 3/04 62/251 |
| 6,148,563 | A * | 11/2000 | Roche | .............. | A47F 3/0434 49/501 |
| 6,334,684 | B1 * | 1/2002 | Yoshida | .............. | G03B 21/001 353/28 |
| 6,558,017 | B1 * | 5/2003 | Saraiji | .............. | A47F 3/001 108/23 |
| 7,163,322 | B2 * | 1/2007 | Tatewaki | .............. | B60Q 1/2696 362/497 |
| 8,562,167 | B1 * | 10/2013 | Meier | .............. | A47B 96/021 362/125 |
| 2001/0036070 | A1 * | 11/2001 | Compagnucci | .............. | A47B 77/00 362/127 |
| 2004/0174701 | A1 * | 9/2004 | Fiene | .............. | F21V 21/002 362/133 |
| 2005/0073224 | A1 * | 4/2005 | Livingston | .............. | A47B 47/0091 312/265.6 |
| 2012/0011754 | A1 * | 1/2012 | Matyear | .............. | B32B 7/14 40/541 |
| 2014/0144083 | A1 * | 5/2014 | Artwohl | .............. | A47F 3/0434 49/70 |
| 2015/0108889 | A1 * | 4/2015 | Bavuso | .............. | A47B 96/00 312/294 |
| 2015/0198319 | A1 * | 7/2015 | Salter | .............. | F21V 9/40 362/293 |
| 2015/0257596 | A1 * | 9/2015 | Vartanian | .............. | F21V 33/008 99/325 |
| 2015/0291084 | A1 * | 10/2015 | Gold | .............. | B60Q 1/323 362/516 |
| 2015/0379905 | A1 * | 12/2015 | Kawasaki-Hedges | .............. | G09F 19/16 40/427 |
| 2016/0051123 | A1 * | 2/2016 | Gleixner | .............. | A47L 15/4246 134/113 |
| 2016/0178825 | A1 * | 6/2016 | Desmond | .............. | G02B 6/004 362/606 |
| 2016/0186984 | A1 * | 6/2016 | Giacomini | .............. | F24C 7/082 362/85 |
| 2017/0038058 | A1 * | 2/2017 | Cano | .............. | F21V 33/004 |
| 2018/0195696 | A1 * | 7/2018 | Walther | .............. | F21S 19/005 |
| 2018/0245786 | A1 * | 8/2018 | Fujiwara | .............. | H05B 47/105 |
| 2019/0023178 | A1 * | 1/2019 | Khayat | .............. | F21S 41/141 |
| 2019/0137092 | A1 * | 5/2019 | Schenkl | .............. | H05B 45/20 |
| 2019/0186173 | A1 * | 6/2019 | Johnson | .............. | E05B 65/44 |
| 2019/0360745 | A1 * | 11/2019 | Lee | .............. | G02B 6/0051 |

FOREIGN PATENT DOCUMENTS

| | | |
|---|---|---|
| DE | 202007006782 U1 | 9/2008 |
| DE | 102008043270 A1 | 5/2010 |
| JP | H04325107 A | 11/1992 |
| WO | 2004/064576 A1 | 8/2004 |

* cited by examiner

FURNISHING COMPONENT FOR RECREATIONAL VEHICLES

TECHNICAL FIELD

The present invention relates to a furnishing component for recreational vehicles such as motor-homes and caravans.

BACKGROUND ART

Recreational vehicles have furnishing components such as shelving, cabinets, cupboards, closets and the like for arranging various objects such as clothes, supplies and tools.

Known furnishing components have a fixed portion, which is associated with the structural casing of the vehicle and defining the space to be used to arrange the objects, and a movable portion, usually a door, which is adapted to close access to this space.

In recreational vehicles, since spaces are limited, it is common to take into account, at the design stage, a rationalization logic that allows saving space while making the furnishing components functional.

In this regard, it is known to install light sources, such as bulbs, LED lights, neon lamps and other emitter elements, on the furnishing components, utilizing the latter as fixed backing to illuminate the environment, without the installation of supports specifically devoted to lighting that would require additional space.

The difficulty is known in making furnishing components for the arrangement of objects that have integrated light sources.

The presence of these latter, in fact, involves the passage of electric wires, electrified seats and cavities specifically made for the passage of wires and electrical components, actually making difficult the installation of light sources, especially on the movable portions of the furnishing components.

For example, it is difficult to apply light sources onto the cabinet doors without letting portions of electrical wires connected to the fixed portion come out.

The same can be said for doors of closets and other similar furnishing components.

The need is also known to use furnishing components to improve the environmental aesthetics and comfort.

In this regard, there is an increasing search for solutions which can be aesthetically appealing and, at the same time, enhance the visual comfort inside the environment.

DESCRIPTION OF THE INVENTION

The main aim of the present invention is to provide a furnishing component for recreational vehicles that improves the aesthetics and visual comfort of the interior of the vehicle.

One object of the present invention is to provide a furnishing component for recreational vehicles which is easy to make and easily replaceable.

Another object of the present invention is to provide a furnishing component for recreational vehicles, which allows to overcome the mentioned drawbacks of the prior art within the ambit of a simple, rational, easy, effective to use and low cost solution.

The above mentioned objects are achieved by the present furnishing component for recreational vehicles, having the characteristics of claim 1.

BRIEF DESCRIPTION OF THE DRAWINGS

Other characteristics and advantages of the present invention will become more evident from the description of a preferred, but not exclusive, embodiment of a furnishing component for recreational vehicles, illustrated by way of an indicative, but non-limiting example in the accompanying drawings, wherein.

EMBODIMENTS OF THE INVENTION

Figure 2:
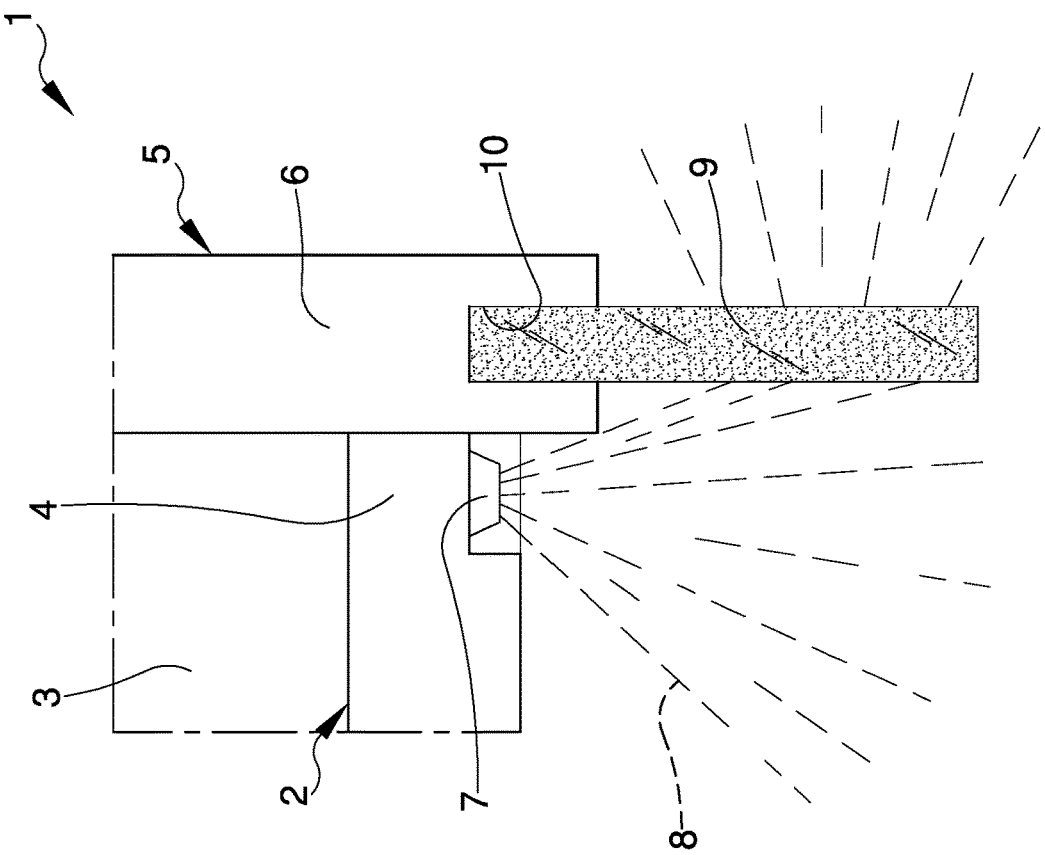
FIG. 2 is a sectional view of a detail of a first embodiment of the furnishing component according to the invention.

With particular reference to these figures, reference numeral 1 globally indicates a furnishing component for recreational vehicles.

The furnishing component 1 comprises a fixed portion 2 associated with a recreational vehicle and defining a space of use 3.

In the embodiments shown in the figures, the illustrated fixed portion 2 is a shelf overhanging from the wall of a recreational vehicle and is surrounded by walls, for sake of simplicity not shown herein, defining the space of use 3.

Solutions cannot be ruled out that provide for different fixed portions, such as grid structures or shelving.

The fixed portion 2 also has at least one stop end 4.

The furnishing component 1 further comprises a movable portion 5 associated with the fixed portion 2 in a variable manner between an opening position and a closing position.

In the opening position, the movable portion 5 is at least partially moved away from the fixed portion 2 so as to allow the access to the space of use 3.

In the closing position, the movable portion 5 is moved close to the fixed portion 2 so as to prevent the access to the space of use 3.

The movable portion 5 comprises at least one approaching portion 6 that in the closing position is approached to the stop end 4.

In these embodiments, the movable portion 5 is of the type of an openable and closable door.

Different solutions cannot be ruled out wherein the movable portion 5 is a drawer or a shutter or any other element commonly used to close the compartments of cabinets, shelves, chests of drawers and similar furnishing components.

According to the invention, the furnishing component 1 comprises at least one emitter element 7 of a luminous flux 8 associated with the fixed portion 2, and at least one diffusing element 9 associated with the movable portion 5.

The diffusing element 9 is at least partially exposed to the luminous flux 8 for its diffusion in the environment.

This way, the diffusing element 9 is struck by the light emitted by the emitter element 7 so that it can in turn diffuse light, with a different intensity, in the surrounding environment.

This feature allows obtaining an illumination at the movable portion 5 without electrification of the movable portion itself.

This way, it is possible to obtain an improved illumination for visual comfort within the environment, as well as pleasing aesthetic effects.

In these embodiments, the movable portion 5 comprises a housing seat 10 for housing the diffusing element 9.

The diffusing element 9 is fitted to measure in the seat 10 and protrudes at least partially from it so as to receive at least in part the luminous flux 8.

This solution allows making the movable portion 5 based on the assembly of simple elements, thus achieving considerable economic advantages.

In these embodiments, the seat 10 is formed at the approaching portion 6, but its different positioning on the movable portion 5 cannot be ruled out.

In particular, the illustrated seat 10 is of the type of a groove extending along the approaching portion 6.

The illustrated diffusing element 9 is of the type of a strip of diffusing material, substantially rigid, fitted to measure into the seat 10 and coming out of it.

Advantageously, the diffusing element 9 comprises methacrylate, i.e. it is made of a material characterized by good diffusing properties, low cost and easy to find.

Solutions other than the one described herein cannot be ruled out wherein, for example, the seat 10 is shaped otherwise, e.g., with an irregular pattern, or is defined by aligned cavities, with the diffusing element 9 in turn shaped in a compatible manner with the seat itself.

Other solutions cannot be ruled out that provide for diffusing elements 9 made of materials other than methacrylate, such as e.g. glass, fiberglass, and other materials that can diffuse light.

Also with reference to the embodiments illustrated, the emitter element 7 is arranged at the stop end 4.

This way, the emitted luminous flux 8 reaches the diffusing element 9 with the intensity needed to create the luminous effect desired in the environment.

Usually, the emitter element 7 is of the type of a battery of light sources which extend longitudinally at the stop end 4.

This way, a luminous beam is parallel to the diffusing element 9, so that the emitted luminous flux 8 strikes the diffusing element itself in a substantially uniform manner.

Preferably, the emitter element 7 is of the type of a battery of light-emitting diodes, but solutions cannot be ruled out that provide for different light sources such as incandescent bulbs, neon lamps, halogen lamps, or the like, as well as solutions cannot be ruled out that provide for single emitter elements, suitably arranged to maximize the luminous flux.

Figure 1:
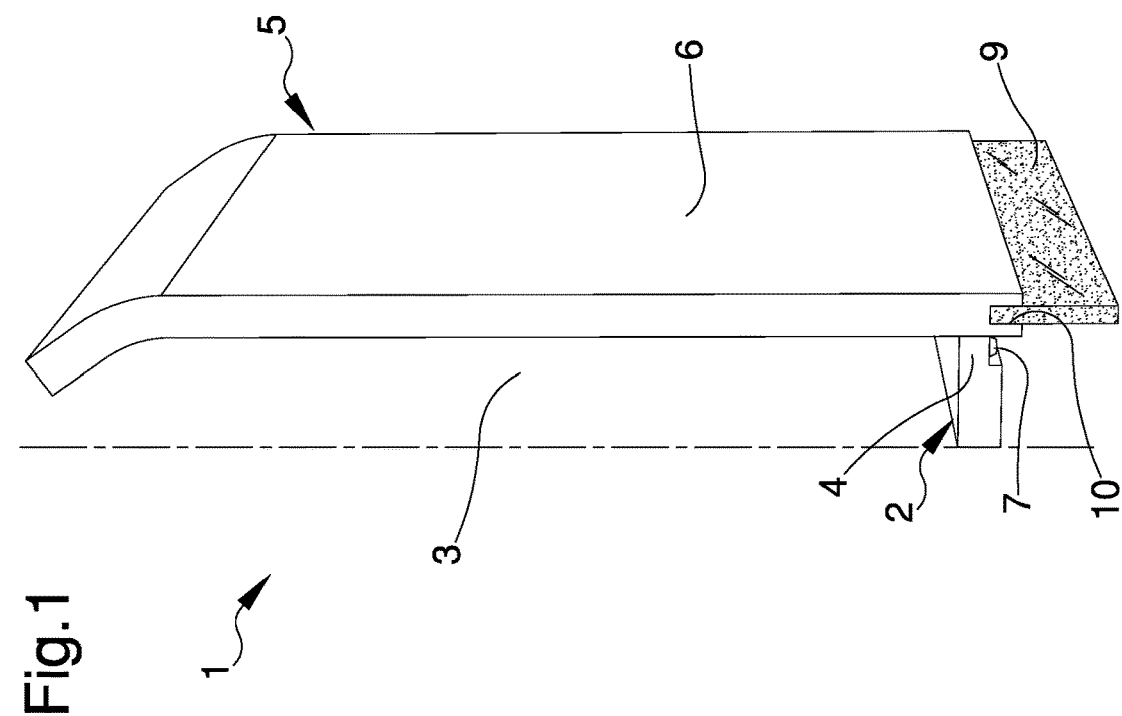
FIG. 1 is an axonometric view of a first embodiment of the furnishing component according to the invention.

In a first embodiment, illustrated in FIGS. 1 and 2, the movable portion 5 comprises a single diffusing element 9 inserted into the seat 10 obtained at the stop end 4.

The fixed portion 2 supports a single emitter element 7 that extends parallel to the diffusing element.

Figure 4:
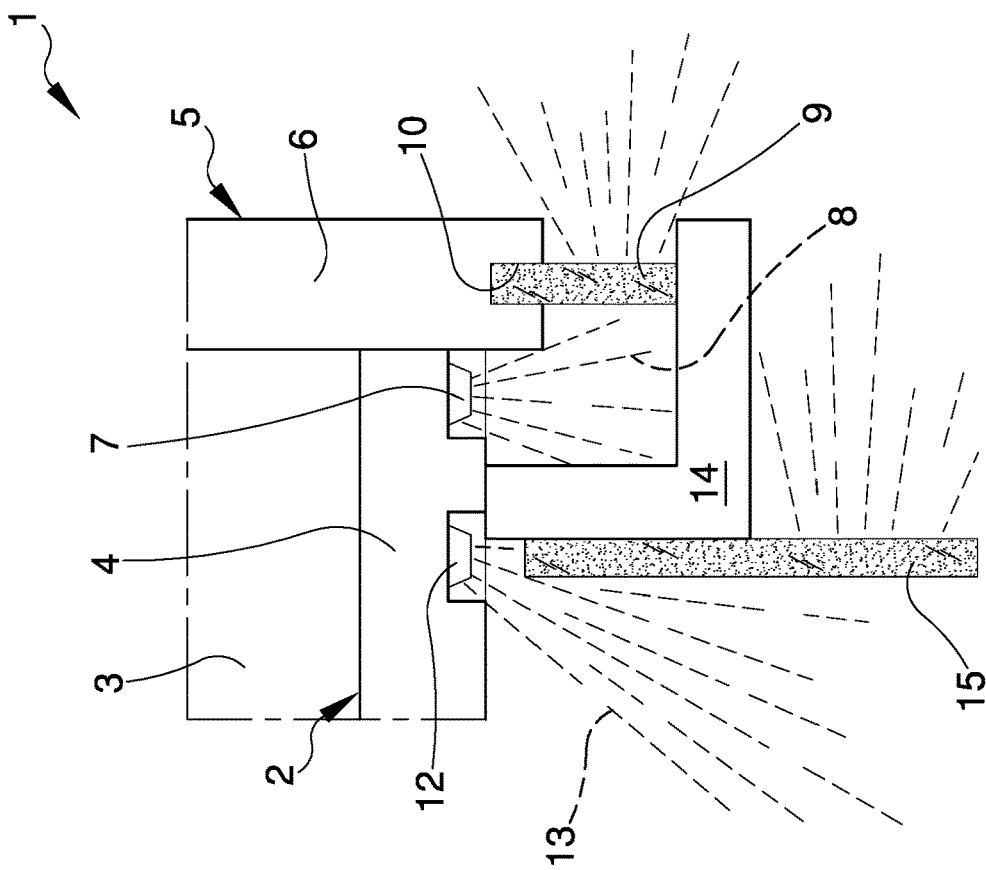
FIG. 4 is an axonometric view of a third embodiment of the furnishing component according to the invention.

In a second embodiment, illustrated in FIG. 4, the movable portion 5 comprises a gripping portion 11 at the diffusing element 9.

The gripping portion 11 is adapted to permit the manual shift of the movable portion 5 from the opening position to the closing position and vice versa.

This way, the luminous effect created by the diffusing element 9 favors the location of the gripping portion 11, facilitating the opening and closing of the movable portion 5 in poor visibility conditions, e.g. at night.

Figure 3:
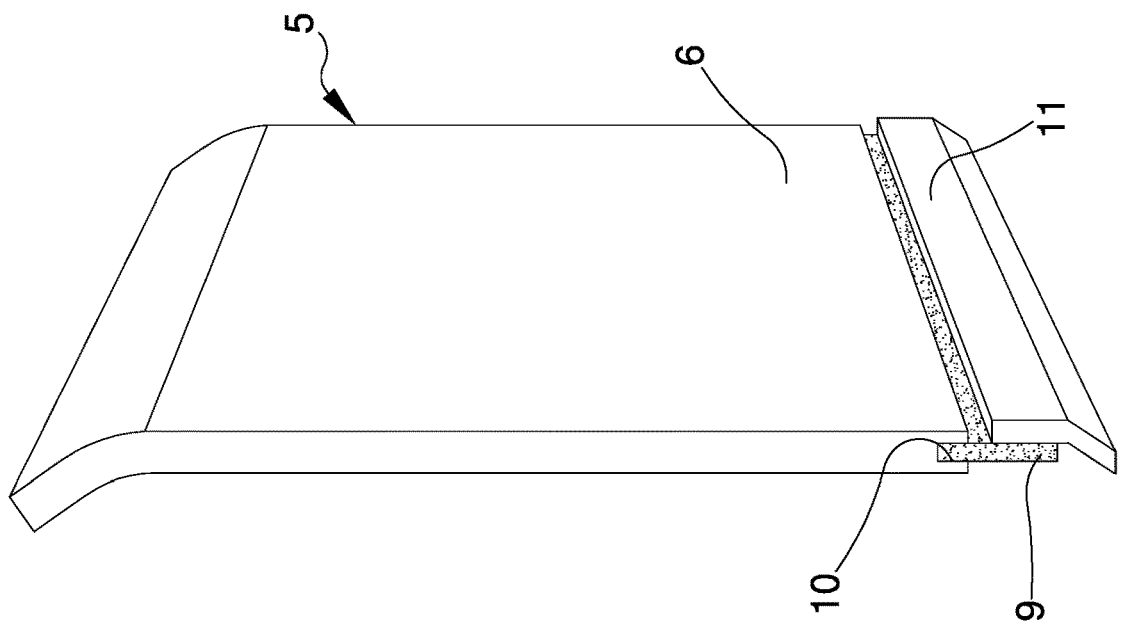
FIG. 3 is a sectional view of a detail of a second embodiment of the furnishing component according to the invention.

In the solution illustrated in FIG. 3, the gripping portion 11 is associated with the diffusing element 9, in particular it is fastened to the diffusing element 9 and extends along it while leaving it partially uncovered.

Different solutions cannot be ruled out wherein the gripping portion 11 is not fastened directly to the diffusing element 9 as long as by the same.

In a third embodiment, illustrated in FIG. 4, the furnishing component 1 comprises both an auxiliary emitter element 12 associated with the fixed portion 2 and adapted to emit an auxiliary luminous flux 13, and an auxiliary portion 14 located between the auxiliary emitter element 12 and the emitter element 7 so as to separate the luminous flux 8 from the auxiliary luminous flux 13.

Advantageously, the auxiliary emitter element 12 is similar to the emitter element 7, but solutions cannot be ruled out involving different auxiliary emitter elements.

Solutions cannot be ruled out that include several auxiliary emitter elements 12 and several auxiliary portions 14.

Furthermore, in this third embodiment, the furnishing component 1 comprises an auxiliary diffusing element 15 associated with the auxiliary portion 14 and at least partially exposed to the auxiliary luminous flux 13 for its diffusion in the environment.

The auxiliary diffusing element 15 is also similar to the diffusing element 9, although different solutions for the two elements 9, 15 cannot be ruled out.

This solution allows obtaining a plurality of different light effects, since independent luminous fluxes can be used on different diffusing elements according to lighting requirements.

Solutions cannot be ruled out wherein there are several auxiliary diffusing elements 15, or solutions that provide for a different positioning of both auxiliary diffusing elements 15 and auxiliary emitter elements 12.

The operation of the present invention is as follows.

The luminous flux 8 emitted by the emitter element 7 partly strikes the diffusing element 9 which, thanks to its physical properties, diffuses the light radiation by creating lighting effects in the surrounding environment.

In the second embodiment, the gripping portion 11 is found by the illumination of the diffusing element 9.

In the third embodiment, the auxiliary diffusing element 15 is exposed to the auxiliary luminous flux 13 emitted by the auxiliary emitter element 12, thus diffusing light radiation similarly to the diffusing element 9, but independently of it.

It has in practice been found that the invention described above achieves the intended objects and in particular it is emphasized that the furnishing component for recreational vehicles allows improving the aesthetics and visual comfort of the vehicle interior environment.

In fact, the devised furnishing component makes it possible to obtain luminous effects on the basis of design choices, as it is sufficient to model at will the shape of the movable portion and particularly of the diffusing element and of the housing seat to obtain different effects, thus improving aesthetics of the enlightened environment, without compromising the visual comfort of the inside environment.

The versatility and availability of numerous types of emitter elements and diffusing elements, in fact, allow designing the environment lighting in the best way.

In addition, the furnishing component for recreational vehicles so conceived is easy to make and replace.

In fact, the described solutions do not require any special constructive device or complicated workmanship.

In fact there are no electrification elements on the movable portion, in particular there are absolutely no wires or other elements necessary for direct lighting.

This way, it is possible to obtain simple movable portions, the installation and replacement of which is simplified thanks to the lack of electrification elements or special construction devices intended to prepare the portion itself for direct electrification.

Consequently, the manufacturing costs of the entire component are also remarkably low.

The invention claimed is:

1. A furnishing component for recreational vehicles comprising:
   a fixed portion associated with a recreational vehicle and defining a space of use; and
   a movable portion associated with said fixed portion in a variable manner between an opening position in which said movable portion is at least partially moved away from said fixed portion to allow the access to said space of use, and a closing position in which said movable portion is moved close to said fixed portion to prevent access to said space of use; and
   wherein said furnishing component comprises:
      at least one emitter element of a luminous flux associated with said fixed portion; and
      at least one diffusing element associated with said movable portion and at least partially exposed to said luminous flux for its diffusion in the environment;
      wherein said fixed portion comprises at least one stop end and that said movable portion comprises at least one approaching portion that in said closing position is approached to said stop end; and
      wherein said at least one emitter element is arranged at said stop end and externally to said space of use in order to radiate said luminous flux in a space external to said space of use.

2. The furnishing component according to claim 1, wherein said at least one emitter element is of the type of a battery of light sources that extend longitudinally at said stop end.

3. The furnishing component according to claim 1, wherein said movable portion comprises a housing seat for housing said diffusing element.

4. The furnishing component according to claim 3, wherein said seat is formed at said approaching portion.

5. The furnishing component according to claim 3, wherein said at least one diffusing element is fitted to measure in said seat and protrudes at least partially from it to receive at least in part said luminous flux.

6. The furnishing component according to claim 1, wherein said at least one diffusing element comprises methacrylate.

7. The furnishing component according to claim 1, wherein said furnishing component comprises:
   at least one auxiliary emitter element associated with said fixed portion and adapted to emit an auxiliary luminous flux; and
   at least one auxiliary portion located between said auxiliary emitter element and said at least one emitter element to separate said luminous flux from said auxiliary luminous flux.

8. The furnishing component according to claim 7, wherein said furnishing component comprises at least one auxiliary diffusing element associated with said at least one auxiliary portion and at least partially exposed to said auxiliary luminous flux for its diffusion in the environment.

9. The furnishing component according to claim 1, wherein said movable portion comprises a gripping portion at said at least one diffusing element and is adapted to permit the manual shift of said movable portion from said opening position to said closing position and vice versa.

10. The furnishing component according to claim 9, wherein said gripping portion is associated with said at least one diffusing element.

* * * * *